May 27, 1969     A. D. STRUBLE, JR     3,446,457
PRESSURIZED VESSEL
Filed Sept. 24, 1965     Sheet _1_ of 2
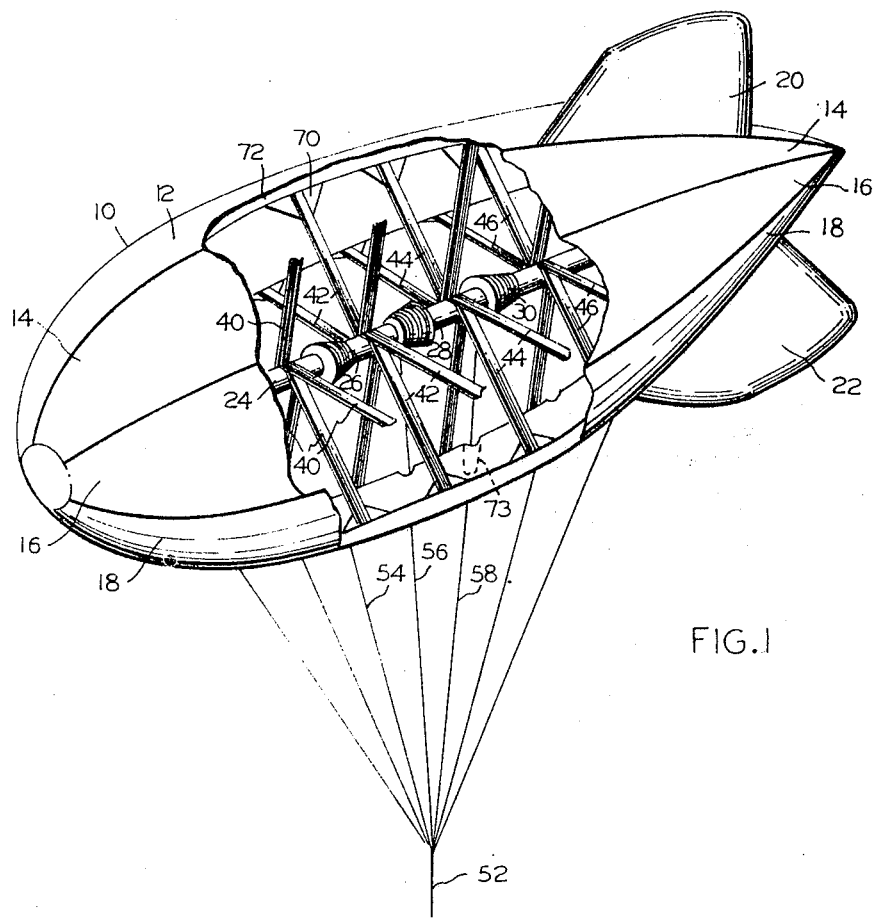
FIG.1
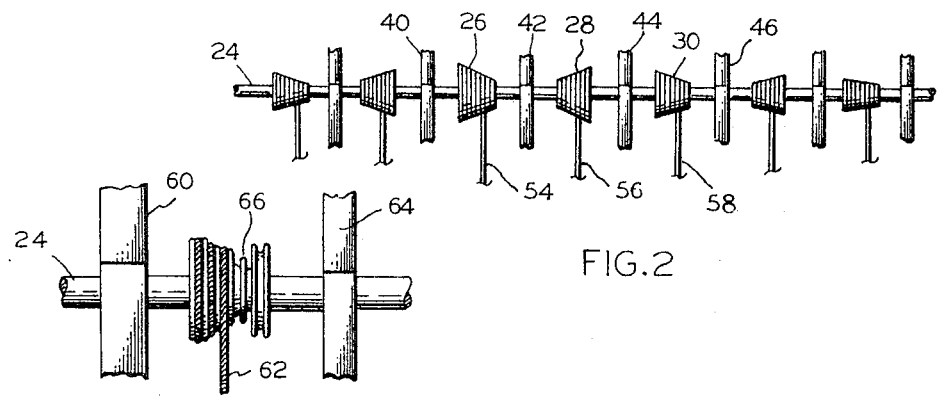
FIG.2
FIG.3

United States Patent Office 3,446,457
Patented May 27, 1969

3,446,457
PRESSURIZED VESSEL
Arthur D. Struble, Jr., Torrance, Calif., assignor to Cutler-Hammer, Inc., Milwaukee, Wis., a corporation of Delaware
Filed Sept. 24, 1965, Ser. No. 489,987
Int. Cl. B64b 1/02, 1/06, 1/40
U.S. Cl. 244—30
16 Claims

ABSTRACT OF THE DISCLOSURE

An expandable and contractible gas-filled dirigible having a plurality of radially disposed webs leading from and attached to the exterior shell of the balloon and having their other ends attached to a central rotatable shaft so that the webs can be wound upon and unwound from the shaft to contract and expand, respectively, the side walls of the dirigible, and contoured reels mounted on the shaft to rotate with the shaft having a control line, mounted on and capable of being wound on and unwound from the reel, extending through a superpressure tube in the bottom of the dirigible and thence to the outside of the dirigible to operate the spindle by pulling on the control line. A plurality of the web, reel and control line arrangements can be spaced end-to-end in the dirigible and they may be independently operable by having the shaft made in separate sections for each combination. An electrical generator may also be mounted on the shaft so that operation of the shaft will generate electricity.

---

The present invention relates to a novel inflatable vessel and to a method and apparatus for superpressuring this vessel.

In the making of measurements and the supporting of equipment above the surface of the earth a convenient method of accomplishing this is to support the instrument by means of a free-floating, lighter-than-air vehicle or a tethered lighter-than-air-vehicle. However, such vehicles have heretofore been rather uncontrollable and limited in their operational capabilities. It is therefore an object of the present invention to provide an improved pressurized vessel for this purpose which can be readily controlled and will generally automatically control itself. The demand for pressruized vessels, particularly those which can be evacuated either manually or automatically, also exists in many other areas. For example, various tanks for fuel and the like, adapted to float on the water, can also be provided by the simple means of this invention. Likewise, expandable aircraft fuel tanks, fuel cells, cryogenic positive expulsion tanks and the like can also be conveniently constructed by following the teachings of this invention. It is, therefore, also an object of this invention to provide an improved pressurized vessel for these uses. However, in the detailed description and examples the lighter-than-air type vessel will be described for illustrative purposes.

In the drawings,

FIGURE 1 is an isometric view, partially in section, of a novel vessel in accordance with the present invention, showing some of the detail of the superpressuring system;

FIGURE 2 is a detailed view of a side of a portion of the take-up reels of FIGURE 1;

FIGURE 3 is a modified form of the take-up reel of FIGURE 2;

Figure 4:
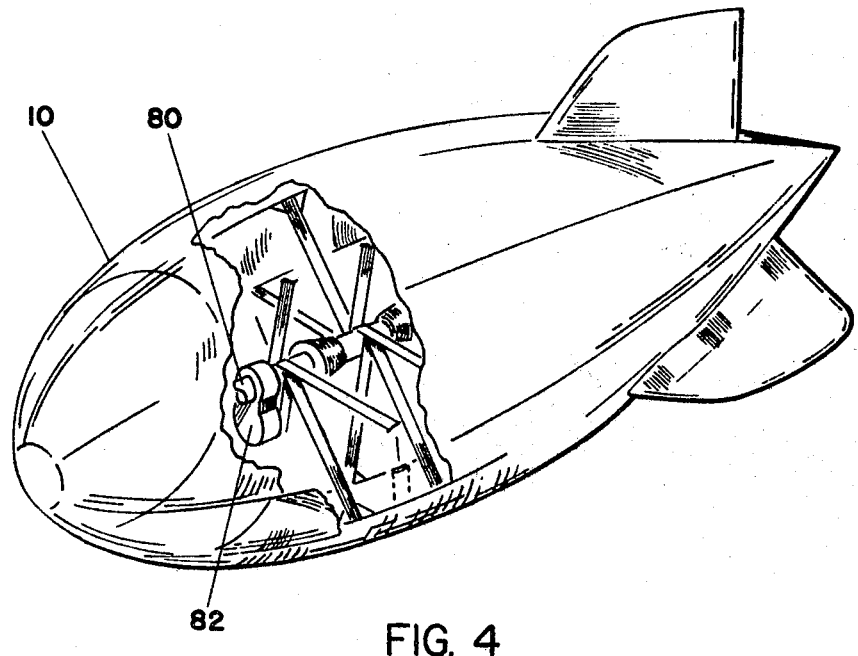
FIGURE 4 is still another isometric view, partially in section, of the vessel of the present invention showing an integral means of generating electrical energy.

In accordance with the drawings a body member generally shaped as a dirigible is designated as element 10. This body member is made up of a plurality of gored elements 12, 14, 16 and 18, respectively, which are joined by seams 72. Mounted on the exterior of the body 10 adjacent the rearward end thereof are stabilizing fins 20 and 22. Passing longitudinally through the center of the body 10 is an elongated center spindle 24. The center spindle 24 may comprise a plurality of individual sections, independently rotatable and coupled together end to end to thereby form an elongated shaft such as 24; or, it may comprise a single shaft. The elongated spindle or shaft 24, whether of a single unit or plural unit construction, is adapted to rotate relative to the body member. Mounted on spindle 24 are a plurality of web elements 40, 42, 44 and 46 which respectively extend to the interior surfaces of the dirigible adjacent the seams 72. As shown by the connection of elements 42, connection to the interior surface is made through webs 70. The superpressuring webs 40, 42, 44 and 46 are adapted to wind up on spindle 24. If spindle 24 is rotated to wind the radial webs up, and thus shorten them, it is obvious that the walls of the body member will be drawn in and the size of the body member reduced. Because of the connection of the webs 40, 42, 44 and 46 at the seams of the gored sections, when the webs are drawn in or shortened and the dirigible is reduced in diameter it will generally take on a sunflower type of configuration or have a petaled effect in cross section. It is obvious, as shown in FIGURE 3, that if the various sections of spindle 24 or the reel on which the webs 40, 42, 44 and 46 are wound are enlarged with respect to one another, the contour of the body member from end to end may be changed. Thus as shown in FIGURE 3 the web 60 is on a locally enlarged take-up; and, thus, shortens at a more rapid rate than the web 64 which is on a smaller take-up. Also, attached to spindle 24 are contoured or generally cone-shaped reels 26, 28 and 30. The contour configuration of reels 26, 28 and 30 is shown in greater detail as reel 66 of FIGURE 3 which has passing thereabout line 62. Reels 26, 28 and 30 are fixedly attached to spindle 24 or to individual sections of the spindle where a plural section spindle is used. Reels 26, 28 and 30 are operated by lines 54, 56 and 58 which pass about these reels. Lines 54, 56 and 58, as well as other lines passing to other reels, not shown, converge below the body and form a single control or tethering line 52. Thus, by the up and down movement of line 52 reels 26, 28 and 30 may be rotated thus rotating the spindle 24 and enlarging or contracting the size of body member 10. This enlargement and contraction will also take place automatically when the body member changes altitude and thus external pressure or when the temperature outside the vehicle changes. Thus, the device by changing its volume under varying atmospheric conditions will automatically rotate the spindle 24 and thus balance the load on the tethering line 52 against the superpressure of the vehicle. The vessel can, therefore, be superpressured by rotating the take-up spindles and a given superpressure maintained automatically or manually. The spindles 26, 28 and 30 are contoured primarily to control and maintain the size and shape of the body member as the size reduces. In other words, the decreasing diameter of these reels is adapted to compensate for the reduction in size of the body member. The lines 54, 56 and 58 pass through the bottom of the vehicle through superpressure tubes 73.

It is readily apparent, from the foregoing description, that an almost unlimited number of capabilities of the vessel can be foreseen by those skilled in the art. For example, the superpressure can be changed under differing conditions, as at different altitudes, by selective contouring of the cable reels 24, 26 and 28. This contouring can be nonlinear and thus the superpressure changes can be made nonlinear. Additionally, the vessel can be made to change its configuration or shape at different conditions of inflation or superpressure by preselecting the size of the spindles or take-ups on which webs 40, 42, 44 and 46 are wound and having such take-ups of differing size with respect to one another. By way of illustration, the vessel could be almost spherical at its high volume condition and long and thin at its low volume condition.

Figure 5:
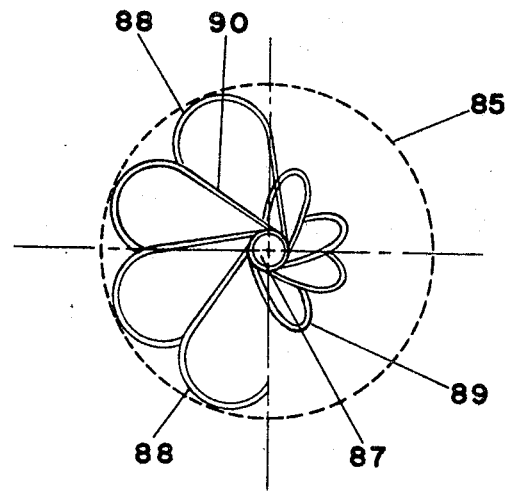
FIGURE 5 is a cross-sectional view showing one configuration change which may be made in the vessel.

In accordance with FIGURE 4 a device similar to that of FIGURE 1 is shown in which the centrally-disposed spindle 80 has mounted thereon a generator 82. Thus, as the spindle 80 is automatically rotated by atmospheric changes, electrical power for the system can be generated by generator 82. Likewise, by pulling the tether line, or control line, moving the vehicle from one altitude to another the spindle 80 will be operated and power will be generated. By properly selecting the ratios and reels a configuration change such as that shown in FIGURE 5 may be brought about. Specifically, the dashed outline 85 shows the original exterior contour of the balloon. 88 shows the unchanged contour of some of the individual sections and 89 shows certain of the sections substantially reduced in size. This uneven reduction of size of the petals of the sunflower shaped vehicle can be brought about by appropriate attachment of the webs 90 to the central spindle 87, the proper selection of sizes and shapes of the take-ups for webs 90, and/ or the selection of the points of attachment of webs 90 to the interior of the balloon.

I claim:

1. An improved pressurized vessel, comprising;
    (a) an elongated body member adapted to receive a fluid and which has at least one portion which is expandable and contractible;
    (b) shaft means rotatably mounted within said body member and having reel means fixedly mounted thereon;
    (c) expansion and contraction means including at least one flexible web attached to the interior surface of said body member and attached to and adapted to be wound about said shaft to enlarge and reduce the internal volume of said body member by rotation of said shaft; and
    (d) control line means extending to the exterior of said body member and operatively connected to said reel means to rotate said shaft.

2. A vessel in accordance with claim 1 wherein the entire body member is expandable and contractible.

3. A vessel in accordance with claim 1 wherein the shaft means is longitudinally and centrally disposed within the body member.

4. A vessel in accordance with claim 1 wherein a plurality of the flexible webs extend radially from the shaft means to the interior surface of the body member.

5. A vessel in accordance with claim 4 wherein plural sets of the plurality of radially extending webs are spaced along the length of the shaft means.

6. A vessel in accordance with claim 1 wherein the reel means is elongated and varies in diameter along its length.

7. A vessel in accordance with claim 1 wherein a plurality of reel means are spaced along the length of the shaft means and a control line means is attached to and adapted to be wound on each of said reel means.

8. A vessel in accordance with claim 7 wherein the control line means extend to a point exteriorly of the body member and are joined to form a single control line.

9. A vessel in accordance with claim 1 wherein the shaft means comprises a plurality of individually rotatable sections mounted end-to-end.

10. A vessel in accordance with claim 9 wherein each of the individual sections has attached thereto at least one radially disposed flexible web extending to and attached to the interior surface of the body member and adapted to be wound on said shaft section to serve as an expansion and contraction means.

11. A vessel in accordance with claim 1 wherein the reel is contoured to adjust the wind-up of the control line in accordance with desired changes in the shape of the body member.

12. A vessel in accordance with claim 1 wherein the reel is contoured to adjust the wind-up of the control line in accordance with desired changes in the diameter of the body member.

13. A vessel in accordance with claim 1 wherein the reel is contoured to adjust the wind-up of the control line in accordance with desired changes in the internal pressure in the body member.

14. A vessel in accordance with claim 1 wherein the reel is larger than the shaft means to thereby provide a mechanical advantage with respect to the shaft means.

15. A vessel in accordance with claim 1 wherein a plurality of flexible webs are attached to the interior of the body member and are attached to and spaced along the length of the shaft means to wind thereon and serve as expansion and contraction means, and the sizes of these webs differ and are preselected to change the take-up ratio when said shaft is rotated.

16. A vehicle in accordance with claim 1 wherein an electrical generator means is attached to and operable by the rotation of the shaft means.

References Cited

UNITED STATES PATENTS 1,717,552  6/1929  Dunn _____ 244—58

FOREIGN PATENTS 442,295  6/1912  France.
130,657  8/1919  Great Britain.

MILTON BUCHLER, *Primary Examiner.*

J. L. FORMAN, *Assistant Examiner.*

U.S. Cl. X.R.

150—.5; 244—31